US010083499B1

(12) United States Patent
Milanfar et al.

(10) Patent No.: US 10,083,499 B1
(45) Date of Patent: Sep. 25, 2018

(54) METHODS AND APPARATUS TO REDUCE COMPRESSION ARTIFACTS IN IMAGES

(71) Applicant: Google Inc., Mountain View, CA (US)

(72) Inventors: Peyman Milanfar, Menlo Park, CA (US); Yi Shen, Palo Alto, CA (US); Feng Yang, Sunnyvale, CA (US); Jingbin Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 59 days.

(21) Appl. No.: 15/290,666

(22) Filed: Oct. 11, 2016

(51) Int. Cl.
*G06T 5/00* (2006.01)
*G06T 5/50* (2006.01)

(52) U.S. Cl.
CPC .............. *G06T 5/005* (2013.01); *G06T 5/50* (2013.01); *G06T 2207/10024* (2013.01); *G06T 2207/20024* (2013.01); *G06T 2207/20221* (2013.01)

(58) Field of Classification Search
CPC . G06T 5/005; G06T 5/50; G06T 2207/10024; G06T 2207/20024; G06T 2207/20221; G06T 5/003; G06T 5/002; G06T 2207/10016; G06T 2207/20084; H04N 19/85; H04N 19/86; H04N 19/117; H04N 19/44; G06K 9/40
See application file for complete search history.

(56) References Cited

U.S. PATENT DOCUMENTS

| 6,636,645 | B1 | 10/2003 | Yu | |
| 7,346,208 | B2* | 3/2008 | Staelin | H04N 19/86 |
| | | | | 375/E7.19 |
| 7,634,150 | B2 | 12/2009 | Malik | |
| 7,868,950 | B1* | 1/2011 | Samadani | H04N 1/58 |
| | | | | 348/607 |
| 8,755,625 | B2* | 6/2014 | Singh | G06K 9/40 |
| | | | | 382/260 |
| 2005/0078872 | A1* | 4/2005 | Samadani | H04N 19/122 |
| | | | | 382/233 |
| 2014/0056537 | A1* | 2/2014 | Srinivasan | G06T 5/003 |
| | | | | 382/261 |
| 2016/0342888 | A1* | 11/2016 | Yang | G06N 3/04 |

(Continued)

FOREIGN PATENT DOCUMENTS

| CN | 106898011 A | * | 6/2017 |
| CN | 107203783 A | * | 9/2017 |

OTHER PUBLICATIONS

Yu, Dong and Loy, Deep Convolution Networks for Compression Artifacts Reduction, Aug. 9, 2016.*

(Continued)

*Primary Examiner* — Brenda C Bernardi
(74) *Attorney, Agent, or Firm* — Brake Hughes Bellermann LLP (57) ABSTRACT

Methods and apparatus to reduce compression artifacts in images are disclosed herein. An example method includes separating at least a portion of an image into a first component and a second component, reducing a first artifact in the first component to form a first cleaned component, reducing, using the first cleaned component, a second artifact in the second component to form a second cleaned component, and combining the first cleaned component and the second cleaned component to form a cleaned image.

16 Claims, 8 Drawing Sheets

(56) References Cited

U.S. PATENT DOCUMENTS

| | | | | |
|---|---|---|---|---|
| 2017/0243084 A1* | 8/2017 | Soatto | ............... | G06K 9/6267 |
| 2017/0345140 A1* | 11/2017 | Zhang | ............... | G06T 7/0004 |
| 2017/0364771 A1* | 12/2017 | Pinheiro | ............ | G06K 9/6212 |
| 2017/0371348 A1* | 12/2017 | Mou | ................. | G05D 1/0257 |
| 2018/0005343 A1* | 1/2018 | Rhoads | .............. | G06T 1/0092 |

OTHER PUBLICATIONS

Zhang et al., Beyond a Gaussian Denoiser: Residual Learning of Deep CNN for Image Denoising, Aug. 13, 2016.*

Mao et al., Image Restoration Using COnvolutional Auto-encoders with Symmetric Skip Connections, Aug. 30, 2016.*

Jain et al., Natural Image Denoising with Convolutional Networks, Jan. 2008.*

Tschopp, Efficient Convolutional Neural Networks for Pixelwise Classification on Heterogeneous Hardward Systems, Sep. 11, 2015.*

Liu, et al., "Data-Driven Soft Decoding of Compressed Images in Dual Transform-Pixel Domain", IEEE Transactions on Image Processing, vol. 25, No. 4, Feb. 2016, 11 pages.

Svoboda, et al., "Compression Artifacts Removal Using Convolutional Neural Networks", Journal of WSCG, vol. 24, Issue 2, May 2016, 10 pages, pp. 63-72, downloaded from https://arxiv.org/abs/1605.00366v1.

Wang, et al., "D3: Deep Dual-Domain Based Fast Restoration of JPEG-Compressed Images", Proceedings of IEEE Conference on Computer Vision and Pattern Recognition, Apr. 9, 2016, 9 pages, downloaded from https://arxiv.org/pdf/1601.04149.pdf.

* cited by examiner

METHODS AND APPARATUS TO REDUCE COMPRESSION ARTIFACTS IN IMAGES

FIELD OF THE DISCLOSURE

This disclosure relates generally to images, and, more particularly, to methods and apparatus to reduce compression artifacts in images.

BACKGROUND

Compression of images by, for example, JPEG and MPEG can create compression artifacts that may be distracting to viewers. Example artifacts include ringing, block, color bleeding artifacts, etc.

SUMMARY

Methods and apparatus to reduce compression artifacts in images are disclosed herein. An example method includes separating at least a portion of an image into a first component and a second component, reducing a first artifact in the first component to form a first cleaned component, reducing, using the first cleaned component, a second artifact in the second component to form a second cleaned component, and combining the first cleaned component and the second cleaned component to form a cleaned image.

DETAILED DESCRIPTION

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Figure 1:
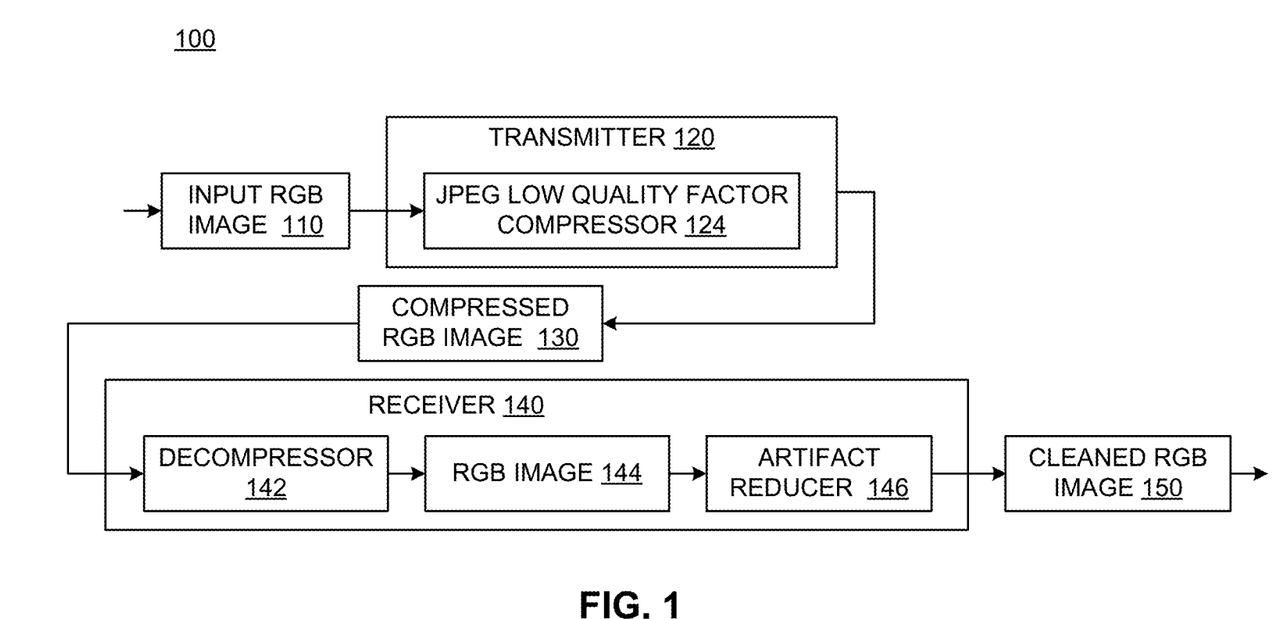
FIG. 1 is a schematic diagram of an example system having a transmitter and a receiver to reduce compression artifacts in accordance with this disclosure.

FIG. 1 is a schematic diagram of an example system 100 having a transmitter 120 and a receiver 140. The example transmitter 120 of FIG. 1 performs a low-quality compression of an image 110, and sends the resulting compressed low-quality image 130 to the receiver 140. Because of the lower quality, the image 130 can be transmitted or stored using fewer bits. The receiver 140 reduces compression artifacts in the received low-quality compressed image 130 using the methods and apparatus disclosed herein. Because of the artifact reduction performed by the receiver 140, the system 100 can produce cleaned images 150 having a quality that would be generally perceived as the same or similar quality as that of images that are compressed at a higher quality. The example system 100 of FIG. 1 may also be used to reduce compression artifacts in a stream of images such as a video on, for example, a frame-by-frame basis. The system 100 may also be used to reduce the number of bits needed to store an image, and reduce compression artifacts when an image is retrieved from storage. In such instances, compression may be performed during storage of an image, and artifact reduction when a compressed image is retrieved.

A low/lower quality or noisy images refers to an image having one or more visible compression artifacts that individually or collectively are generally perceived as at least partially distracting a viewer of an image, at least partially impeding viewing or use of an image by a viewer, at least partially reducing ones enjoyment of an image, etc. A high/higher quality image is generally perceived as being visually free of such artifacts. The reduction, cleaning, removal, etc. of compression artifacts from an image refers to an image having fewer visual compression artifacts after artifact reduction than before. Not all compression artifacts need to have been removed. In some instances, all compression artifacts are at least visually or wholly removed or decreased. Likewise, a cleaned image is one that has had some compression artifacts visually removed or reduced. Not all compression artifacts need to be visually or wholly removed for an image to be considered as cleaned. One of ordinary skill in the art would be able to inspect images and immediately identify images as low/lower quality or noisy, high/higher quality, or cleaned. For ease of discussion, images discussed herein are two-dimensional, although images having other dimensions could be processed using the examples disclosed herein. Compression artifacts may be due to JPEG compression, block-based video compression, or any other form of compression.

Figure 2A:
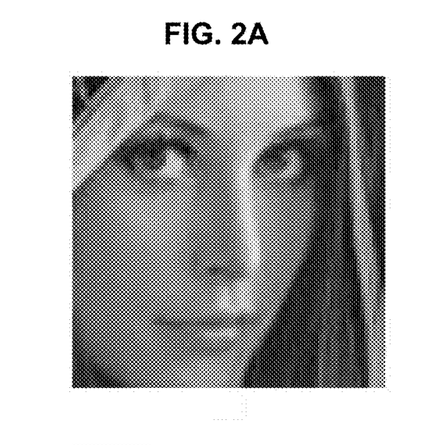
FIGS. 2A through 2D are images showing blocking and ringing artifacts that are processed using the methods and apparatus described herein.
Figure 2B:
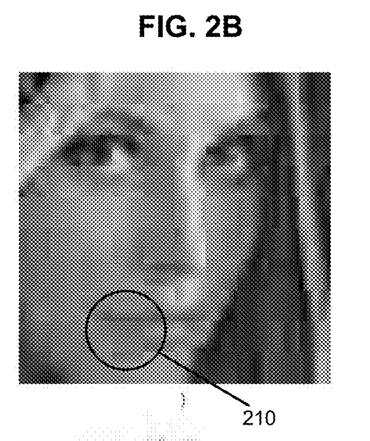
Figure 2C:
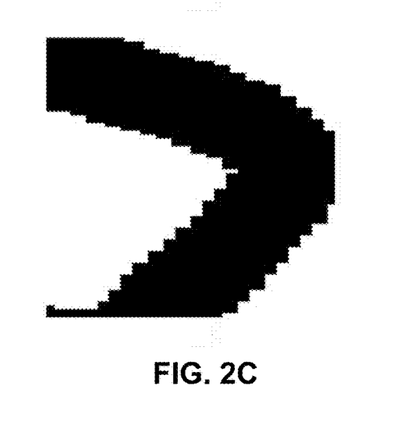
Figure 2D:
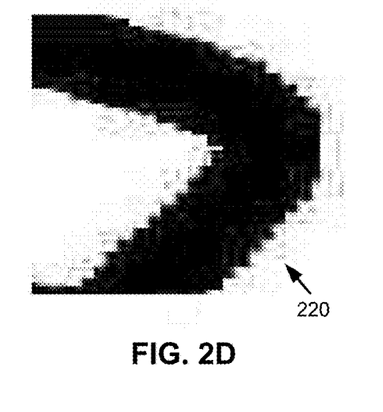

FIGS. 2A-2D illustrate example blocking and ringing artifacts that are processed using the methods and apparatus described herein. FIG. 2A is a portion of an uncompressed image, and FIG. 2C is a portion of another uncompressed image. FIG. 2B is an image formed by JPEG compression of the first image of FIG. 2A, and FIG. 2D is an image formed by JPEG compression of the second image of FIG. 2C. The compression applied to form the images of FIG. 2B and FIG. 2D was with a quality setting of 10, where the quality setting ranges from 0 to 100, with a larger number representing a compressed image of higher quality. Blocking artifacts 210 are visible in FIG. 2B, and ringing articles 220 are visible in FIG. 2D.

Figure 3A:
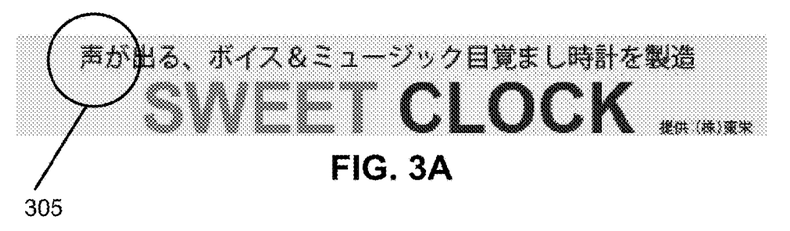
FIGS. 3A through 3F are images showing example reductions of compression artifacts using the example methods and apparatus disclosed herein.
Figure 3B:
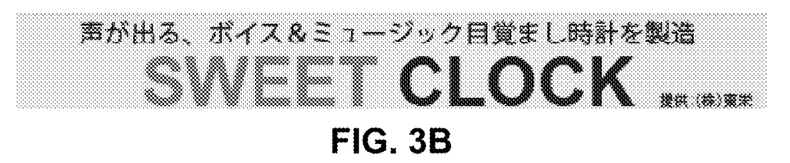
Figure 3C:
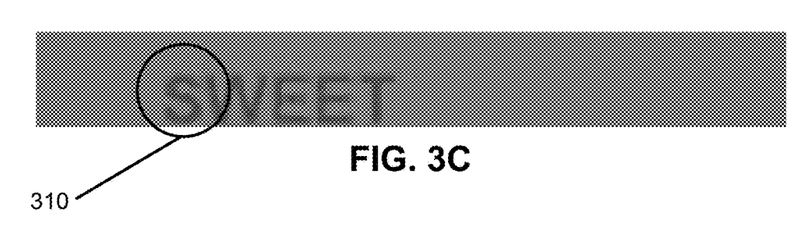
Figure 3D:
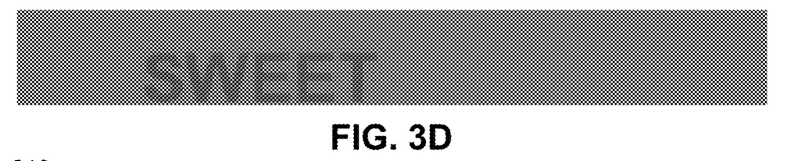
Figure 3E:
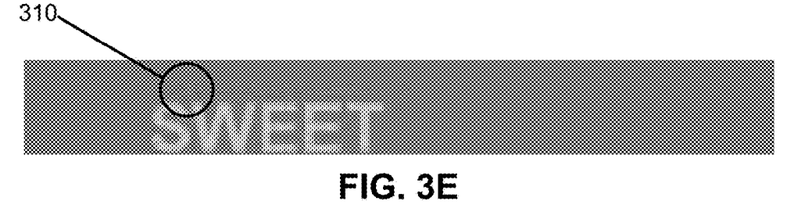
Figure 3F:
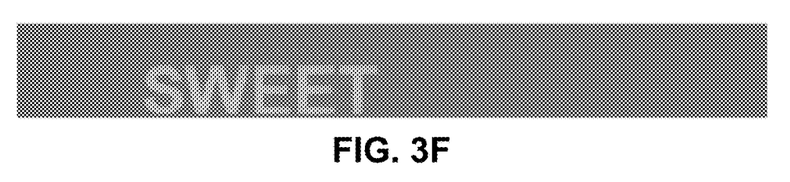

FIGS. 3A-3F illustrate example compression artifact reductions in accordance with the teachings of this disclosure. FIGS. 3A, 3C and 3E show, respectively, a luma component (Y), a blue-difference chroma component (Cb) and a red-difference chroma component (Cr) of a noisy input image. FIGS. 3B, 3D and 3F show, respectively, the luma component, the Cb component and the Cr component after the noisy input image is cleaned by the artifact cleaner 146 of FIG. 1. As can be seen, compression artifacts 305, 310 and 315 have been reduced by the artifact cleaner 146.

For ease of discussion, the disclosures herein are described with reference to RGB images, and splitting images into luma (Y) and chroma (CbCr) components for compression artifact reduction. It should be recognized that images according to other formats (e.g., YCbCr) may be used, with conversions between image formats used as needed. While examples disclosed herein process an image to remove compression artifacts based on its luma component and based on its CbCr component, processing according to additional or alternative components and/or according to additional or alternative paths are contemplated. Other color spaces that may be used to represent images and/or split them into constituent components include, but are not limited to, YUV, YIQ, YDbDr, YPbPr, YCgCo, Lab, CIELUV, CIEUVW, HSL, HSV, and HCL.

Returning to FIG. 1, to compress an input RGB image 110, the example transmitter 120 includes a compressor 124. The example compressor 124 of FIG. 1 compresses the input RGB image 110 using, for example, JPEG compression, to form the compressed RGB image 130 provided to the receiver 140 by the transmitter 120, or is stored for later retrieval. Any method, apparatus, device, interface, etc. at the transmitter 120 and the receiver 140 may be used to provide the compressed RGB image 130 to the receiver 140.

To decompress the compressed RGB image 130, the example receiver 140 includes a decompressor 142. The example decompressor 142 of FIG. 1 decompresses the compressed RGB image 132 using, for example, JPEG decompression, to form an RGB image 144. To reduce compression artifacts, the receiver 140 includes an artifact reducer 146 to remove compression artifacts from the RGB image 144, thus, forming a cleaned RGB image 150. The example artifact reducer 146 of FIG. 1 will be discussed in more detail below in connection with FIG. 4.

In the example of FIG. 1, images other than RGB images may be used. In some examples, the artifact reducer 146 processes YCbCr images and, thus, YCbCr images may be the input image 110 and the output image 150. Alternatively, an RGB input 110 may be processed to form a YCbCr image 144 for processing by the artifact reducer 146.

Figure 4:
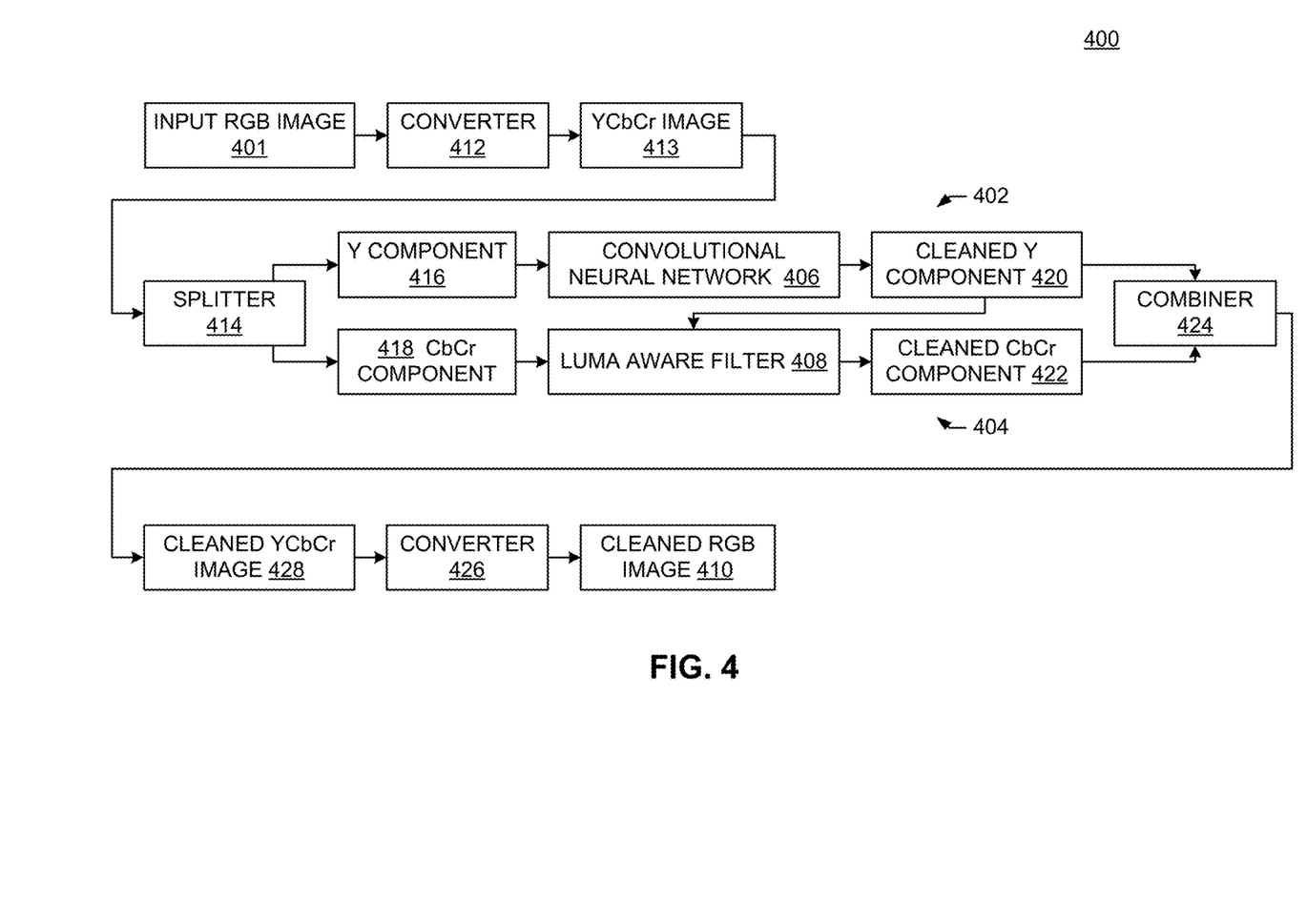
FIG. 4 is a schematic diagram showing an artifact remover in accordance with the teachings of this disclosure.

Turning to FIG. 4, a schematic diagram of an artifact reducer 400 in accordance with the teachings of this disclosure is shown. The artifact reducer 400 may used to implement the artifact reducer 146 of FIG. 1. In general, the artifact reducer 400 converts and splits an input image 401 for a luma path 402, and a CbCr path 404. The luma path 402 includes a convolutional neural network (CNN) 406 to reduce block and ringing compression artifacts in a luma component. The cleaned luma component is used to determine coefficients of a luma-aware filter 408 in the CbCr path 404, which is used to reduce color, block and ringing compression artifacts in the CbCr path 404. The filter 408 is referred to as luma-aware because its coefficients depend on results in the luma path 402. The cleaned luma component and the cleaned CbCr component are combined to form a cleaned output image 410. In the examples disclosed herein, the CNN 406 is trained with low-quality JPEG compressed images and, thus, the CNN 406 removes JPEG compression artifacts. If the CNN 406 were trained with images having other types of artifacts (possibly in addition to JPEG compression artifacts, then the CNN 406 would be able to remove other types of artifacts.

To form a luma component 416 and a CbCr component 418, the example artifact reducer 400 includes a converter 412 and a splitter 414. The converter 412 converts the input RGB image 401 into a YCbCr image 413. When the input image 401 is a YCbCr image, conversion by the converter 412 may be omitted. The splitter 414 separates the YCbCr image 413 into its luma component 416 and its CbCr component 418.

The convolutional neural network 406 processes the luma component 416 to remove compression artifacts from the luma component 416, forming a cleaned luma component 420. The convolutional neural network 406 will be described in more detail in connection with FIGS. 5 and 6.

The luma aware filter 408 filters the CbCr component 418 to reduce compression artifacts in the CbCr component 418, forming a cleaned CbCr component 422. The luma aware filter 408 filters the CbCr component using, for example, a filter implemented as a two-dimensional sum-of-products. An example filter implemented by the luma aware filter 408 can be expressed mathematically as $$CbCr(i,j)^C = \sum^{(s,t) \text{ in neighborhood of } (i,j)} W(s,t) CbCr(s,t), \qquad \text{EQN (1)}$$

where CbCr(s, t) are samples of the CbCr component 418, W(s, t) are the filter coefficients, and $CbCr^C(i, j)$ are samples of the cleaned CbCr components 422. The size of the neighborhood around (i, j) can be varied depending on the amount of compression artifacts in an image. If the image has many compression artifacts, a larger neighborhood may be beneficial. However, use of a neighborhood that is too big, may result in blurring in an output image. In some examples, a difference between an input image and an output image of the CNN 406 is used to estimate the amount of compression artifacts in the input image. In some examples, the neighborhood includes just immediate neighbors. The filter 408 is luma aware due to the dependence of the filter coefficients W(s, t) on the cleaned luma component 420. Example filter coefficients W(s, t) can be expressed mathematically as $$W(s,t) = e^{-\frac{(Y(s,t)-Y(i,j))^2}{sigma1^2}} e^{-\frac{(s-j)^2}{sigma2^2}}, \qquad \text{EQN (2)}$$

where Y(s, t) and Y(i, j) are samples of the cleaned luma component 420, and tuning parameters sigma1 and sigma2 reflect different weights for different locations and different pixel values. If sigma1 is larger, more weight is given to pixels that are close to the pixel Y(i,j). If sigma2 is larger, more weight is given to pixels that are close to pixel (i,j). These tuning parameters may be selected based on the amount of compression artifacts in the image. (i,j) is the pixel to recover and (s, t) is the neighbor pixels, both are preferably inside the image, i.e., 0<=i, s<=height, 0<=j, t<=width.

To form the final cleaned image 410, the example artifact reducer 400 includes a combiner 424 and a converter 426. The combiner 424 combines the cleaned luma component 420 and the cleaned CbCr component 422 to form a cleaned YCbCr image 428. The converter 426 converts the cleaned YCbCr image 428 to form the cleaned RGB image 410. When the output image 410 is a YCbCr image, conversion by the converter 426 may be omitted.

Figure 5:
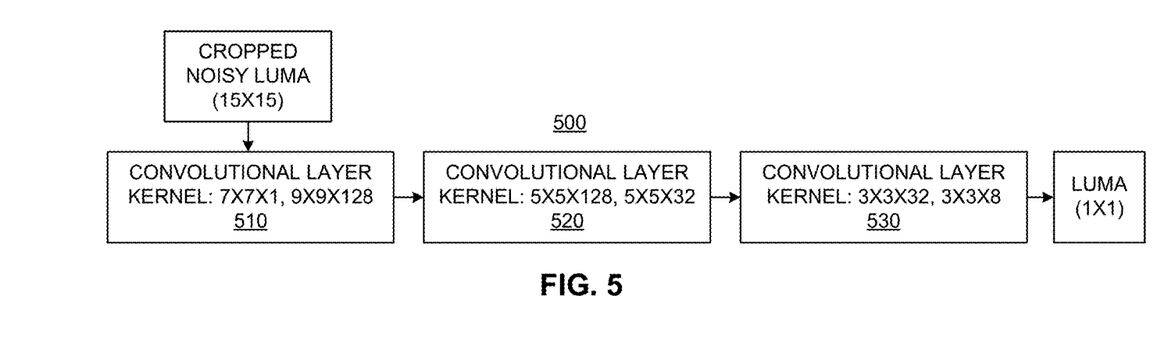
FIG. 5 is a schematic diagram of an example convolutional neural network (CNN).

FIG. 5 is an example CNN 500 that may be used to implement the CNN 406 of FIG. 4. The example CNN 500 includes three convolutional layers 510, 511 and 512. An example manner of implementing the example convolutional layers 510-512 is described below in connection with FIG. 6. The CNN 500 makes predictions by learning relationships between features present in input data and some observed response, and then using what it has learned to make predictions based on input data. In the CNN 500, each network layer 510-512 uses convolution as a detection filter for detecting the presence of specific features or patterns present in input data. In examples described herein, 3 layers 510-512 are used herein as a tradeoff between speed and quality, however, more or fewer layers could be used. In some examples, a Rectified Linear Unit (RELU) activation layer is added after the first two convolutional layers 510 and 511. Additionally or alternatively, a hyperbolic tangent activation layer could be added after the last convolutional layer 512.

First layers (e.g., the layer 510) in the CNN 510 detect relatively larger features that can be recognized and interpreted relatively easy. Later layers (e.g., layer 511) detect successively smaller features that are more abstract, and are often present in many of the larger features detected by earlier layers. Last layers of the CNN (e.g., the layer 512) are able to make the most specific classification by combining all the specific features detected by the previous layers in the input data.

Figure 6:
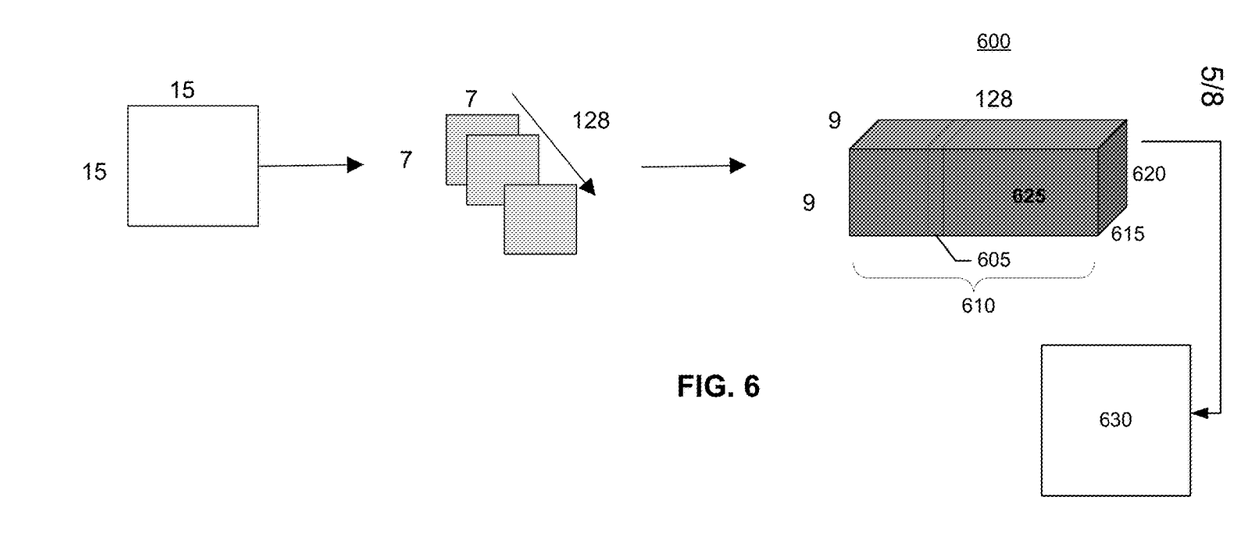
FIG. 6 is an illustration of an example convolutional layer.

In general, each of the layers 510-512 includes a filter 600 (see FIG. 6) having a three-dimensional set of learnable filters (or kernels), one of which is designated with reference numeral 605 in FIG. 6. Broadly speaking, a filter 605 processes input data to transform the input data into output data. Input data is multiplied by coefficients/weights, and outputs of the multiplications are added together to form the output data. The filters 605 of FIG. 6 are constructed as neural networks and include a three-dimensional mesh of interconnected nodes, with connections between the nodes associated with learnable/trainable weights. Consider an example where the output of a first node is multiplied by the weight associated with a first link between the first node and the second node to form a first product. The output of a third node multiplied by the weight associated with a second link between the third node and the second node to form a second product. The first product and the second product added together to represent the output of the second node. The value of a weight/coefficient reflects the influence a node has on another node. For instance, a first node may be connected to a second node with a first weight, and to a third node with a second weight. The first weight and the second weight determine to which of the second node and the third node the first node has the most influence. In another instance, when a node has a large output but is connected to another node via path with a low weight, the node may have a small influence on the other node. Connections may exist between nodes of a filter 605, and between nodes of different filters. There may not be full connectivity between nodes within a filter 605, or between filters 605. Fully connectivity referring to each node being connected to all other nodes. The filters 605 extend through the full depth 610 of the filter 600, forming a larger three-dimensional arrangement of nodes. The coefficients of each filter 605 are convolved across the width 615 and height 620 of the input volume 625, computing a dot product between the coefficients of the filter 605 and its input (s), producing a three-dimensional activation map 630 for that filter 605.

The filter 510-512 activates and provides an indication when it sees some specific type of feature at some spatial position in the input volume 625. Each of the layers is specified by a set of numbers in the form of A×A×1, B×B×N, C. For layer 510, A×A is the size of inputs, which is 7×7. The 7×7 inputs are taken via 128 crops of a C×C (e.g., 15×15) original image size, accordingly the depth N of the filter 625 is 128. Inputs to the filter 600 are 9×9, where B is selected as B=15−2*(A−1)/2. The parameters A and C can be used to tradeoff between output image quality and speed. As the value of A and the value of C increase, the image quality improves, but more computations are needed.

During compression artifact reduction, each pixel of an image being cleaned is processed separately. A 15×15 patch of the luma component of the image around the center pixel of the patch is used as the 15×15 input to the CNN 500. The output of the CNN 500 is a cleaned version of the center pixel of the patch. If the 15×15 patch extends beyond the edge(s) of the input image, the boundary may be mirrored. Alternatively, the boundary(-ies) may be extended using the value of the center pixel as the edge pixel(s).

Figure 7:
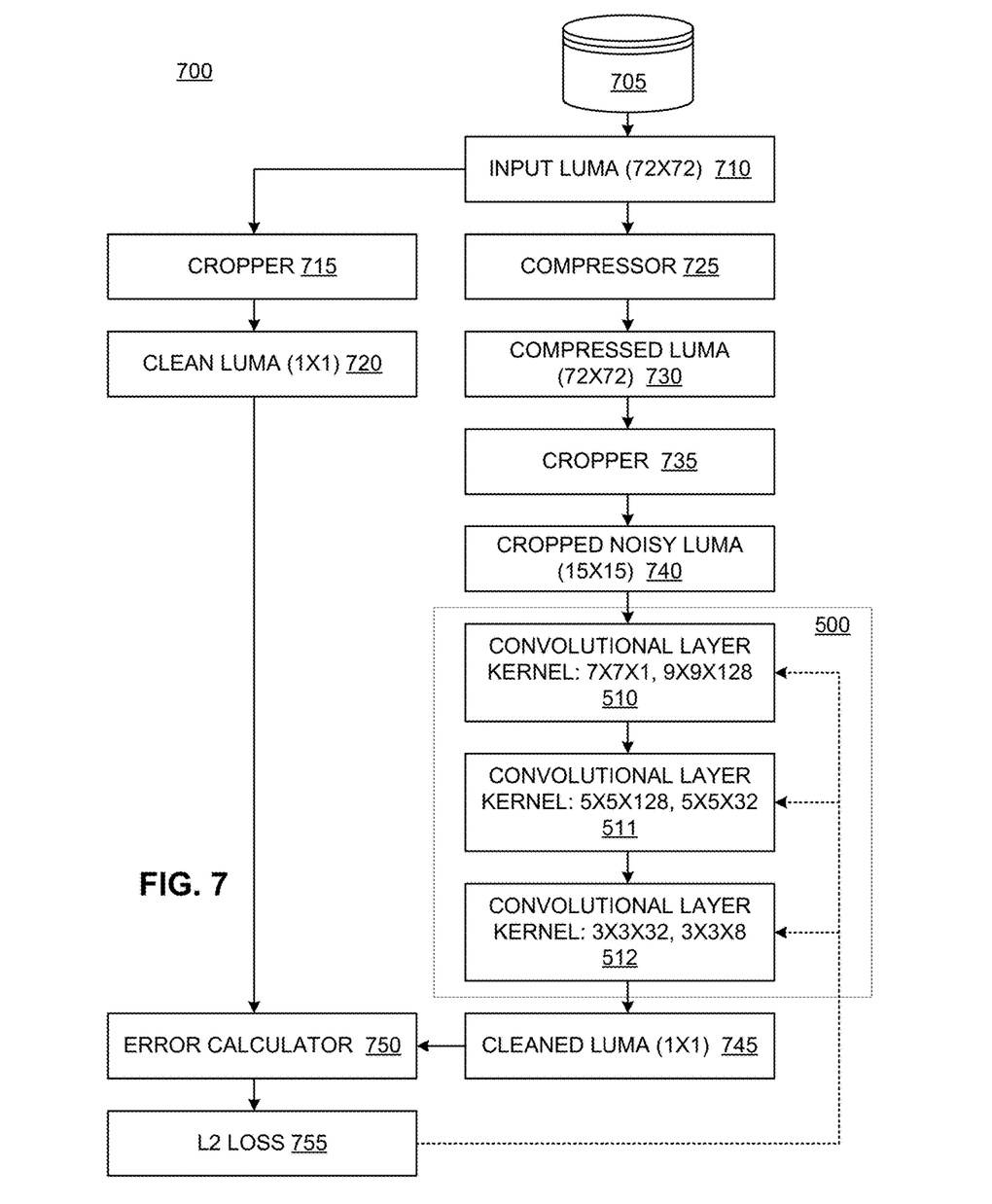
FIG. 7 is a schematic diagram of an example trainer in accordance with this disclosure.

FIG. 7 illustrates an example arrangement 700 that can be used to train the coefficients of the CNN 500 of FIG. 5, and the CNN 406 of FIG. 4. The arrangement 700 compares a clean luma value (left side of FIG. 7) with a compressed luma value that is then cleaned by the CNN 406 (right side of FIG. 7), and uses a difference thereof to update coefficients of the CNN 406. A plurality of images stored in a database 705 are used to train the CNN 406.

Consider first the left side of FIG. 7. For each 72×72 training input image 710, which may be a crop of a larger training image, a cropper 715 crops the image to form a 1×1 clean luma sample 720. The 72×72 training input image 710 is taken from the larger training image. Multiple 72×72 images 710 can be taken from the same larger training image. In the example of FIGS. 3A-3F, one million training images were processed.

Turn now to the right side of FIG. 7. For each 72×72 training input image 710, a compressor 725 forms a compressed 72×72 luma image 730. Different 72×72 luma images 730 may be compressed with different compression qualities. The 72×72 compressed luma image 730 is cropped by a cropper 735 to form a noisy cropped 15×15 image 740 from the center of the compressed luma image 730. The noisy cropped 15×15 image 740 is processed through the CNN 500, as discussed above, to obtain a cleaned 1×1 luma sample 745.

An error calculator 750 calculates an L2 loss (least squares error) 755 between the clean luma sample 720 and the cleaned luma sample 745. The L2 loss 755 is used to update filter coefficients of the CNN 500, as can be the case with convolutional layers.

Figure 8:
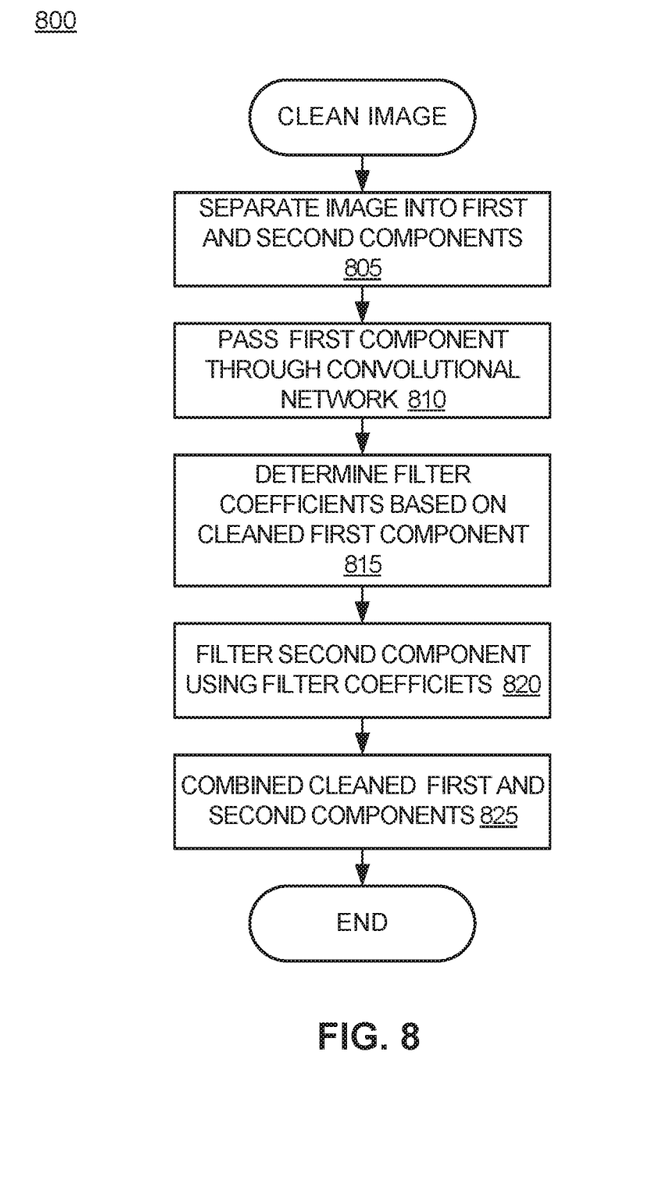
FIG. 8 is a flowchart representing an example method that may be used to reduce compression artifacts.

FIG. 8 is a flowchart of an example method 800 that may, for example, be implemented as machine-readable instructions performed by one or more processors, such as the example processors P00 and P50 (FIG. 9), to reduce compression artifacts in images.

The example method 800 of FIG. 8 includes separating an image into a first (e.g., a luma) component and a second (e.g., a CbCr) component (block 805). In some examples, an RGB image is converted to a YCbCr image, and then separated into the luma component and the CbCr component. The first component is passed through a CNN to reduce a first compression artifact from the first component to form a cleaned first (e.g., luma) component (block 810). The cleaned second component output by the CNN is used to determine filter coefficients (block 815). The cleaned first component is used to reduce a second compression artifact in the second component to form a cleaned second (e.g., CbCr) component using, for example, the filter coefficients (block 820). The cleaned first (e.g., luma) component and the cleaned second (e.g., CbCr) component are combined to form an output image (block 825). In some examples, the luma component and the CbCr component are combined to form a YCbCr image and then converted to form an RGB image.

In one general aspect, a method includes separating at least a portion of an image into a first component and a second component, reducing a first artifact in the first component to form a first cleaned component, reducing, using the first cleaned component, a second artifact in the second component to form a second cleaned component, and combining the first cleaned component and the second cleaned component to form a cleaned image.

Example implementations may include one or more of the following. For instance: reducing the first artifact includes applying a convolutional neural network to the first component; training the convolutional neural network using the luma channel of a plurality of images; the convolutional neural network is trained using a cropped luma patch to recover a center pixel; the image is a frame of a video signal, the image is an RGB image; the first component represents a luma component, and the second component represents a chroma component; reducing the second artifact includes applying a filter having coefficients based on the first recovered component; and/or the filter computes a sum of products of the second component and the coefficients.

In another general aspect, an apparatus includes a splitter to separate at least a portion of an image into a first component and a second component, a convolutional neural network to reduce a first artifact in the first component to form a first cleaned component, a filter having coefficients determined based on the first cleaned component to filter a second artifact in the second component to form a second cleaned component, and a combiner to combine the first cleaned component and the second cleaned component to form a cleaned image.

Example implementations may include one or more of the following. For instance: the convolutional network includes three convolutional layers; the convolutional neural network is trained using the luma channel of a plurality of images; the convolutional neural network is trained using a luma patch to recover a center pixel; the image is a frame of a video signal; the image is an RGB image, the first component represents a luma component, and the second component represents a chroma component; and/or the filter computes a sum of products of the second component and the coefficients.

In still another general aspect, a non-transitory machine-readable media storing machine-readable instructions that, when executed, cause a machine to at least separate at least a portion of an RGB image into a luma component and a chroma component, reduce a first artifact in the luma component to form a cleaned luma component, reduce, using the cleaned luma component, a second artifact in the chroma component to form a cleaned chroma component, and combine the cleaned luma component and the cleaned chroma component to form a cleaned RGB image.

Example implementations may include one or more of the following. For instance: reduce the first artifact by applying a convolutional neural network to the luma component; train the convolutional neural network using luma patch to recover a center pixel; reduce the second artifact by applying a filter having coefficients based on the first recovered component; and/or apply the filter by computing a sum of products of the second component and the coefficients.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms P00 and P50 discussed below in connection with FIG. 9. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. carried out by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms P00 and P50 discussed below in connection with FIG. 9. Machine-readable instructions include, for example, instructions that cause a processor, a computer and/or a machine having a processor to perform one or more particular processes or methods. When a claim of this patent incorporating one or more of the elements of FIGS. 1, 4, 5 and 6 is read to cover a wholly software and/or firmware implementation, at least one of these elements is hereby expressly defined to include a non-transitory article of manufacture such as a non-transitory machine-readable medium storing machine-readable instructions such as the firmware and/or software.

The example methods disclosed herein may, for example, be implemented as instructions, program code, machine-readable instructions carried out by a processor, a computer and/or other machine having a processor. A processor, a controller and/or any other suitable processing device such as those shown in FIG. 9 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 9. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

Figure 9:
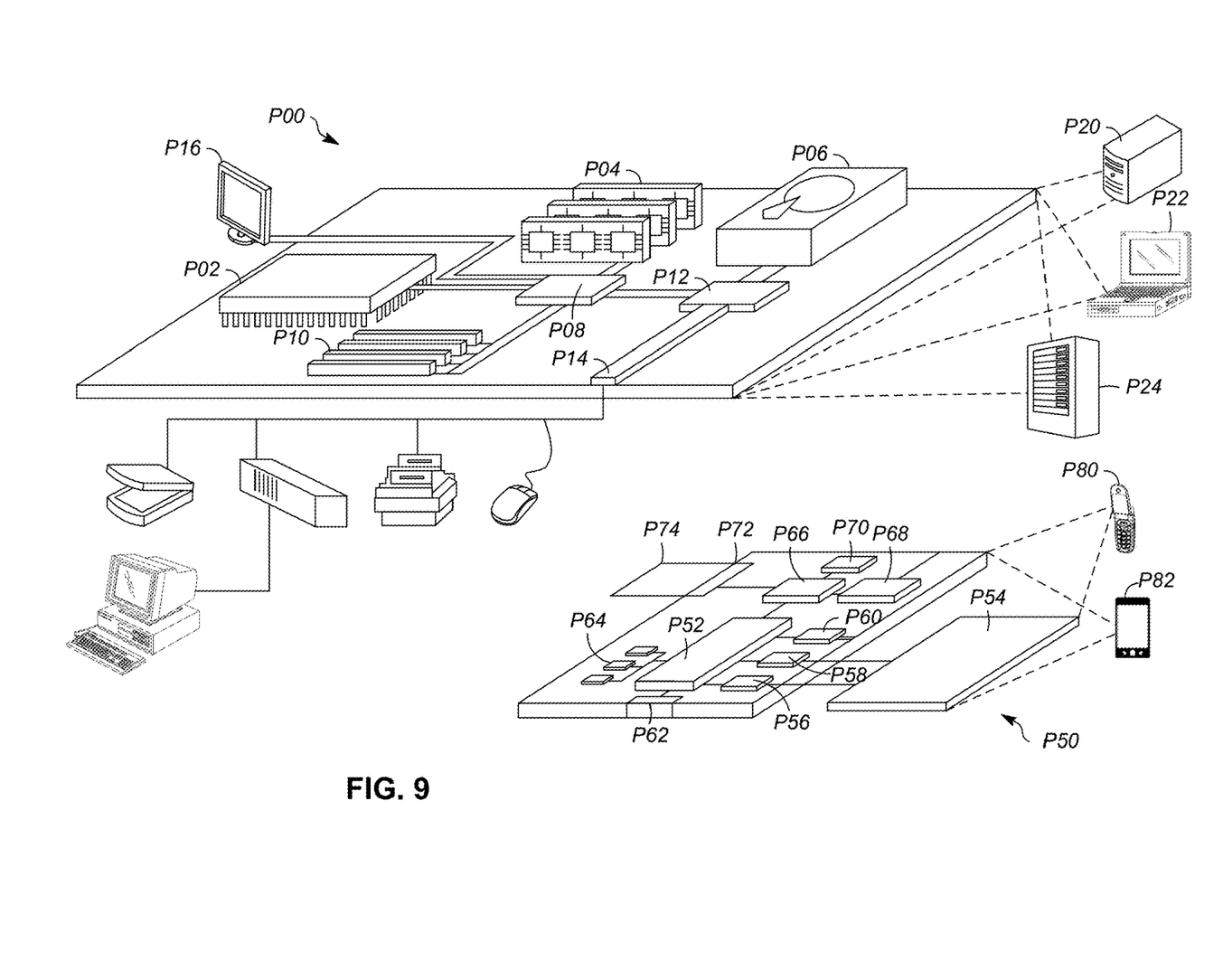
FIG. 9 is a block diagram of an example computer device and an example mobile computer device, which may be used to implement the examples disclosed herein.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor. FIG. 9 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
   separating at least a portion of an image into a first component and a second component;
   reducing a first artifact in the first component to form a first cleaned component by applying a convolutional neural network to the first component;
   reducing, using the first cleaned component, a second artifact in the second component to form a second cleaned component by applying a filter having coefficients based on the first cleaned component; and
   combining the first cleaned component and the second cleaned component to form a cleaned image.

2. The method of claim 1, further comprising training the convolutional neural network using luma channels of a plurality of images.

3. The method of claim 2, wherein the convolutional neural network is trained using a cropped luma patch to recover a center pixel.

4. The method of claim 1, wherein the image is a frame of a video signal.

5. The method of claim 1, wherein the image is an RGB image, the first component represents a luma component, and the second component represents a chroma component.

6. The method of claim 1, wherein the filter computes a sum of products of the second component and the coefficients.

7. An apparatus comprising:
   a splitter to separate at least a portion of an image into a first component and a second component;
   a convolutional neural network to reduce a first artifact in the first component to form a first cleaned component;
   a filter having coefficients determined based on the first cleaned component to filter a second artifact in the second component to form a second cleaned component; and
   a combiner to combine the first cleaned component and the second cleaned component to form a cleaned image.

8. The apparatus of claim 7, wherein the convolutional network comprises three convolutional layers.

9. The apparatus of claim 7, wherein the convolutional neural network is trained using luma channels of a plurality of images.

10. The apparatus of claim 9, wherein the convolutional neural network is trained using a luma patch to recover a center pixel.

11. The apparatus of claim 7, wherein the image is a frame of a video signal.

12. The apparatus of claim 7, wherein the image is an RGB image, the first component represents a luma component, and the second component represents a chroma component.

13. The apparatus of claim 7, wherein the filter computes a sum of products of the second component and the coefficients.

14. A non-transitory machine-readable media storing machine-readable instructions that, when executed, cause a machine to at least:
   separate at least a portion of an RGB image into a luma component and a chroma component;
   reduce a first artifact in the luma component to form a cleaned luma component by applying a convolutional neural network to the luma component;
   reduce, using the cleaned luma component, a second artifact in the chroma component to form a cleaned chroma component by applying a filter having coefficients based on the cleaned luma component; and
   combine the cleaned luma component and the cleaned chroma component to form a cleaned RGB image.

15. The non-transitory machine-readable media storing machine-readable instructions of claim 14 that, when executed, cause the machine to train the convolutional neural network using a luma patch to recover a center pixel.

16. The non-transitory machine-readable media storing machine-readable instructions of claim 14 that, when executed, cause the machine to apply the filter by computing a sum of products of the chroma component and the coefficients.

* * * * *

UNITED STATES PATENT AND TRADEMARK OFFICE
CERTIFICATE OF CORRECTION

PATENT NO. : 10,083,499 B1
APPLICATION NO. : 15/290666
DATED : September 25, 2018
INVENTOR(S) : Milanfar et al.

Page 1 of 1

It is certified that error appears in the above-identified patent and that said Letters Patent is hereby corrected as shown below:

On Page 2, Column 1, item (56), Under "OTHER PUBLICATIONS", Line 3, delete "COnvolutional" and insert -- Convolutional --, therefor.

On Page 2, Column 1, item (56), Under "OTHER PUBLICATIONS", Line 8, delete "Hardward" and insert -- Hardware --, therefor.

Signed and Sealed this
Twenty-first Day of May, 2019

Andrei Iancu
*Director of the United States Patent and Trademark Office*